Nov. 10, 1959  R. E. GOULD  2,911,798
VEHICLE REFRIGERATING APPARATUS
Filed April 4, 1958
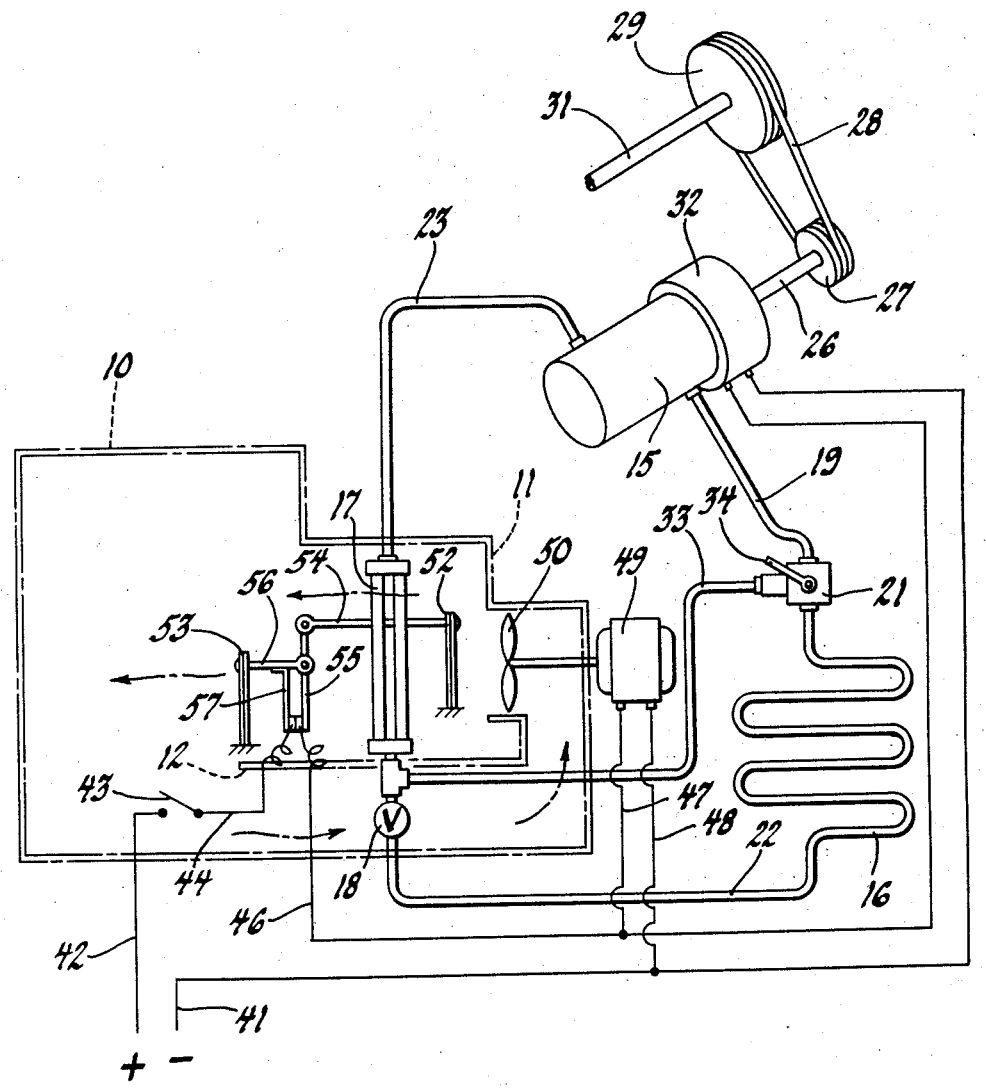
INVENTOR.
Richard E. Gould
BY Edwin S. Wybenga
HIS ATTORNEY United States Patent Office 2,911,798
Patented Nov. 10, 1959

2,911,798

VEHICLE REFRIGERATING APPARATUS

Richard E. Gould, Dayton, Ohio, assignor to General Motors Corporation, Detroit, Mich., a corporation of Delaware Application April 4, 1958, Serial No. 726,510

13 Claims. (Cl. 62—180)

This invention relates to refrigerating apparatus and more particularly to an improvement in air conditioning systems for use on automobiles and the like.

A number of problems present themselves in the design, arrangement and use of air conditioning systems for passenger car or automobile cooling. For example it has been found that a refrigerating system of an air conditioning installation in an automobile upon losing some of the charge of refrigerant from the system will continue to produce a certain amount of refrigeration which ordinarily, under moderate prevailing temperatures, prevent the operator of the automobile from detecting that the system is incapable of cooling the interior of the passenger compartment to a proper low temperature when the temperature ambient thereto rises. Under this condition of reduced refrigerant charge, the circulation of refrigerant and oil admixed therewith in the refrigerating system is diminished and lubrication of bearings and other parts of the compressor of the system is impaired. This is due to reduced evaporation of refrigerant in the evaporator and a less intense circulation thereof therefrom which causes refrigerant to separate from oil in the evaporator whereupon an abnormal quantity of oil becomes entrapped in the evaporator and thus starves the compressor of proper lubrication. This invention provides a conduit connection in the refrigerating system for bypassing refrigerant discharged from the compressor around the condenser and expansion valve, or other means for controlling admission of refrigerant to the evaporator, whereby to flow the bypassed refrigerant, under certain conditions during operation of the system, directly into the evaporator to cause a temporary more intense ebullition of refrigerant therein and flow therefrom of entrapped oil back to the compressor. By properly lubricating the compressor, during operation thereof while the charge of refrigerant in the refrigerating system is low, parts thereof are prevented from burning out or becoming damaged and failure of the compressor is avoided. The operator of the automobile should, on a subsequent hot or hotter day, notice or detect that the refrigerating system when put in operation is no longer capable of cooling the interior of the car to a desired low temperature and will therefore have the refrigerating system checked by a serviceman. The serviceman upon finding and correcting the difficulty will add a quantity of refrigerant to the system to bring it up to a prescribed charge which overcomes the problem. The provision of means for discharging hot refrigerant directly into the evaporator of the refrigerating system to force oil entrapped therein back to the compressor when the refrigerant charge in the system is quite low prevents failure of the compressor and the expense of replacing same. This affords the refrigerating system of an automobile air conditioning installation with a protective arrangement by which an alert operator of the automobile may be warned of improper functioning of the refrigerating system and will promptly have same checked and corrected. Failure to heed this warning and continued loss of refrigerant charge could cause compressor failure without some further automatic protective device.

Upon excessive loss of refrigerant from the system or after substantially the entire charge has leaked out of same a paradoxical situation exists in which the evaporator actually adds heat to air circulated thereover and causes air being discharged therefrom to be hotter than air being circulated toward the evaporator. It is desirable to provide a refrigerating system of an automobile air conditioning apparatus with a means for automatically stopping operation of the compressor of the system upon excessive loss of refrigerant therefrom, irrespective of control thereof by a driver or operator of the vehicle, to prevent the compressor from being damaged. This invention proposes to utilize the paradoxical situation described to provide an automatic compressor protective control. In this invention control of the compressor is accomplished by differential air temperatures and when the refrigerating system ceases to cool air circulated over the evaporator thereof and starts to add heat to the air the difference in temperature of air directed toward the evaporator and warmer air passing over or leaving same is employed to stop operation of the compressor by declutching same from its driving connection to the engine of the automobile.

An object of this invention is to provide an improved refrigerating system for an automobile air conditioning apparatus wherein the compressor of the refrigerating system is protected against being damaged when an alert operator of the automobile senses that the refrigerant charge in the system has become too low.

Another object of this invention is to provide in a refrigerating system of an automobile air conditioning apparatus means for bypassing refrigerant discharged from the compressor of the system and circulating the bypassed refrigerant directly into the lower portion of the evaporator thereof to force oil out of the evaporator and back to the compressor during periods of a diminished charge of refrigerant in the system whereby to properly lubricate parts of the compressor and prevent its being damaged.

A further object of this invention is to provide an improved refrigerating system for an automobile air conditioning apparatus wherein operation of the compressor of the refrigerating system will be stopped automatically in response to conditions created by the system irrespective of the setting of the manually actuated control for the apparatus so as to prevent compressor failure.

In carrying out the foregoing objects it is a still further and more explicit object of this invention to provide in an automobile air conditioning apparatus a control for stopping operation of the compressor of the refrigerating system thereof automatically in response to a temperature differential between warm air directed toward the evaporator of the system and warmer air passed thereover or leaving same.

Further objects and advantages of the present invention will be apparent from the following description, reference being had to the accompanying drawings, wherein a preferred form of the invention is clearly shown.

In the drawings:

The drawing is a diagrammatic showing of a refrigerating system of an air conditioning apparatus for an automobile and illustrating the compressor of the system as being adapted to be driven from the engine of the automobile through an electrically operated solenoid clutch.

Referring to the drawing the numeral 10 indicates in dot-dash lines the passenger containing compartment of a vehicle such as an automobile and the dot-dash lines indicated at 11 and 12 designate, respectively, a shroud and a baffle within the shroud for confining circulated air in the body of the automobile. The refrigerating system or apparatus of an air conditioning or cooling arrangement carried by the vehicle comprises a compressor 15, a condenser 16, an evaporator 17 and an expansion valve or means 18 for admitting liquid refrigerant to the evaporator. A conduit 19 connects the discharge outlet of compressor 15, through a pressure operated and manually adjustable by-pass valve 21, to condenser 16, a conduit 22 connects the condenser 16 through expansion valve 18, to evaporator 17 and a return conduit 23 connects evaporator 17 to the inlet side of compressor 15 to provide a closed refrigerating system. Compressor 15 may be of any suitable or conventional construction and has an operating shaft (not shown) adapted to be clutched to a driving shaft 26 carrying a pulley 27 connected, by a belt 28, to a pulley 29 mounted on a shaft 31 driven by the automobile engine (not shown). The clutch, generally represented at 32, intermediate shaft 26 and compressor 15 may be of any suitable or well-known construction and is preferably of an electromagnetic operated type such for example as disclosed in the P. W. Maurer Patent No. 2,791,100 dated May 7, 1957 or in the J. Weibel, Jr. Patent No. 2,816,636 dated December 17, 1957. A branch by-pass conduit 33 extends from valve 21 to the bottom or inlet side of evaporator 17, between the evaporator and expansion valve 18. By-pass valve 21 is spring loaded to normally maintain communication between conduit 19 and condenser 16 and is operable by differences in pressure of refrigerant in the system between the low pressure, conduit 33, and high pressure sides thereof to automatically and periodically establish communication of conduit 19 with conduit 33 for a purpose to be hereinafter described. Valve 21 is also manually adjustable by the operator of the automobile through a lever 34 having a Bowden wire connected thereto and extended into compartment 10. The construction and operation of the valves depicted at 18 and 21 are well known to those skilled in the art and are of any suitable or conventional structure. An electric circuit, connected to the storage battery of the vehicle, is provided for the solenoid of electromagnet clutch 32. This circuit includes the wires 41 and 42, a manually actuated switch 43 located in compartment 10, wires 44 and 46 and branch wires 47 and 48 leading to the motor 49 of a blower or fan 50 within shroud 11. A temperature differential sensing device or switch, schematically illustrated in the drawing, comprises two spaced apart bimetal members mounted on suitable supports on opposite sides of evaporator 17 within the shroud 11 in the path or air adapted to be circulated by the fan or blower 50 over the evaporator. One bimetal member 52 is located at the side of evaporator 17 in the air flow to be directed toward and over the evaporator. The other bimetal member 53 is located on the opposite side of evaporator 17 in the path of air passed over the evaporator toward compartment 10. These bimetal members 52 and 53 are tied together by a rod or link 54 having one end thereof secured to member 52 and pivotally carrying on its other or free end a lever 55 which lever is also pivotally attached to a rod or link 56 secured to member 53. A spring or resilient type arm 57 is secured to the rod or link 56 and normally closed electric contacts, one on the lever 55 and the other on spring arm 57, are adapted to break or open the circuit between wires 44 and 46 in a manner and for a purpose as will hereinafter be explained. The rod or link 54 is extended through an open part of evaporator 17 to either side thereof. Bimetal members 52 and 53 and the linkage therebetween are, by virtue of spring arm 57, adapted to at one time move in the same direction in unison, while the electric contacts remain closed, and at another time member 53 is adapted to move relative to member 52 in a direction toward the same to open the electric contacts of the switch portion of the sensing device.

Assume that the automobile engine is started and the vehicle is being propelled thereby. Switch 43 is normally open to deenergize blower motor 49 and the solenoid operated clutch 32 whereby the compressor shaft is declutched from its driving shaft 26 and consequently from the automobile engine. Should it now be desired to cool compartment 10 the operator of the vehicle closes switch 43 to complete the electric circuit through wires 42, 44, 46 and wires 47 and 48 to wire 41. This energizes both blower motor 49 and the solenoid of the electromagnetic clutch 32. Clutch 32 thereupon connects shaft 26 to the shaft of compressor 15 and the compressor is operated by or driven from the vehicle engine through the shaft 31 thereof, pulley 29, belt 28 and pulley 27. Motor 49 is also operated to cause the blower 50 to circulate air from compartment 10 under the baffle 12 into shroud 11 and over the evaporator 17 of the refrigerating system. Operation of compressor 15 causes vaporized refrigerant from evaporator 17 to be drawn, through conduit connection 23, into the intake side of the compressor. Refrigerant compressed by the compressor 15 is discharged under pressure therefrom through the conduit 19 and valve 21 into the condenser 16. Condenser 16 is cooled in any suitable or conventional manner so as to condense and liquefy refrigerant entering same. Liquid refrigerant flows by way of conduit 22 into evaporator 17 under the control of the expansion valve 18. Oil missible with the refrigerant, for lubricating operating parts of the compressor 15, is also normally circulated throughout the refrigerating system. The refrigerant in evaporator 17 absorbs heat from air circulated over the evaporator by blower or fan 50 and vaporizes in the evaporator for cooling air circulated thereover to a desired low temperature. Air being circulated over bimetal member 52 toward and over evaporator 17 is ordinarily warmer than air leaving the evaporator and passing over bimetal member 53. The temperature differential sensing device, its pivoted together links 54 and 56 together with its lever 55 and the contacts on this lever and on spring arm 57 remain in the position thereof shown in the drawing under this condition to maintain compressor 15 operatively clutched to and driven by the vehicle engine and to continue operation of blower 50 so as to cool or air condition the compartment 10. Thus the sensing device or temperature differential switch device herein disclosed is inactive as long as the refrigerating system is producing refrigeration and it is responsive only to air leaving evaporator 17 which is warmer than air being circulated toward the evaporator. The temperature in passenger compartment 10 of the automobile is automatically maintained between predetermined limits by the pressure actuated valve 21. When the temperature within compartment 10 becomes lower than is desired the pressure of the volatile fluid in the low pressure side of the refrigerating system, evaporator 17 and conduit 33, drops below a predetermined low limit and this low pressure acts on the spring loaded valve 21 to open same for establishing communication of conduit connection 19 with conduit 33. Some of the refrigerant discharged from compressor 15 is now metered by valve 21 and by-passed around condenser 16 and expansion valve 18 directly into the lower portion of evaporator 17. The hot gaseous refrigerant entering evaporator 17 increases its temperature and consequently increases the temperature of circulating air leaving the evaporator and flowing into compartment 10. The pressure in the low pressure side of the refrigerating system is increased by the by-passed refrigerant and valve 21 thereupon closes automatically. In this manner passenger compartment 10 of the automobile is maintained between desired temperature limits and the periodic or momentary temperature increase of evaporator 17 under this normal operating condition is insufficient to cause operation of the switch of the temperature differential or sensing device herein disclosed. As before stated the temperature limits between which compartment 10 is maintained may be varied by the operator of the vehicle manually changing the normal setting of lever 34 to consequently adjust the adjustable automatic spring loaded by-pass valve 21.

Suppose now that some of the refrigerant in the refrigerating system or apparatus of the air conditioning arrangement disclosed gradually leaks out of the system to diminish the original charge thereof therein. Circulation of refrigerant and oil admixed therewith in the system, particularly through the evaporator 17, is reduced by the diminished charge of refrigerant and lubricating oil becomes trapped in the evaporator. However the refrigerating system still contains enough refrigerant to continue to cool compartment 10 of the automobile on moderate temperatured days even tho its refrigerant charge may be insufficient to cool the compartment to a desired low temperature on hot days. The low refrigerant charge and reduced circulation of refrigerant and oil in the system presents hazardous operation of compressor 15. Continued operation of the refrigerating system under this condition still permits valve 21 to be periodically opened when the demand for refrigeration in compartment 10 has been met or when the temperature therein has been lowered below its predetermined low limit. Opening of valve 21 by-passes refrigerant discharged from compressor 15 and condenser 16 and expansion valve 18 and the by-passed hot refrigerant gas directly enters the lower portion of evaporator 17. The hot gas introduced into evaporator 17, under this condition of reduced refrigerant charge in the system, is utilized advantageously to cause a temporary intense ebullition of liquid refrigerant and oil in the evaporator which forces oil entrapped therein therefrom and back to the compressor 15, through conduit 23, to lubricate parts thereof. Thus while the refrigerating system continues to cool compartment 10 sufficiently on moderate temperatured days and returns oil to compressor 15 its bearings and moving parts thereof will be protected from being burned out. The slight warming of evaporator 17 and air leaving same to vary the temperature within compartment 10 is not enough to cause actuation of lever 55 and arm 57 of the temperature differential device or switch. The refrigerating system is, due to the diminished charge of refrigerant therein, now incapable of cooling compartment 10 to a desired low temperature on a day that is substantially hotter than a moderate temperature day. An alert driver or operator of the automobile should therefore on a subsequent hotter day notice the inadequacy of the air conditioning apparatus and will promptly have same checked by a serviceman. The serviceman upon fixing or repairing the leak in the refrigerating system and adding refrigerant to the diminished charge thereof therein will correct the difficulty and compressor 15 is thereby prevented from being damaged. Thus the feature of by-passing hot refrigerant gas around certain elements of a refrigerating system in an automobile air conditioning apparatus directly into the lower portion of the evaporator thereof in addition to regulating the temperature in compartment 10 automatically under normal operating conditions also overcomes hazardous operation of the compressor particularly when the charge of refrigerant in the system has become diminished.

However if the operator of the vehicle does not heed the warning described or should another driver, who may be less adept to noticing the malfunctioning of the air conditioning apparatus, operate the vehicle or automobile with the refrigerating system in operation after continued or excessive loss of refrigerant therefrom the compressor may fail and be damaged beyond repair. There is, in accordance with this invention, provided means which takes control of the air conditioning apparatus away from the driver and automatically stops the compressor 15 to prevent its failure. This means is the temperature differential responsive or sensing device schematically illustrated in the drawing. Thus if the automobile and the refrigerating system of the air conditioning apparatus are operated on a hot day with excessive leakage of refrigerant from the system and when same is incapable of cooling compartment 10 pressure of the small amount of refrigerant remaining in the system is insufficient to hold valve 21 closed and hot refrigerant is circulated through and causes evaporator 17 to add heat to air flown thereover. The automatic sensing device of the present disclosure will now come into play to prevent damage to and failure of the compressor 15. That is as long as air leaving the evaporator 17 is substantially colder than air being circulated toward same, under the normal and hazardous operating conditions of the refrigerating system described, the temperature differences on opposite sides of the evaporator maintains the sensing device inactive. When the charge of refrigerant in the refrigerating system of the air conditioning apparatus has become depleted or excessively diminished so that air leaving the evaporator 17 is warmer than air circulated toward same bimetal member 52 will remain immovable while bimetal member 53 will bow or move, to the right as viewed in the drawing, to shift the lever 55, about its pivotal connection to rod or link 54, and the electric contact thereon will move away from the electric contact on spring arm 57. This breaks or opens the electric circuit between wires 44 and 46, independently of switch 43, and deenergizes the electromagnet of clutch 32 to declutch compressor 15 from its driving elements of the automobile engine whereby operation of the compressor is automatically stopped. Blower motor 49 is also stopped and the discontinuance of circulating air into and throughout compartment 10 together with the increase in temperature thereof immediately serves as an alarm to the operator of the automobile or passengers therein that the air conditioning apparatus has stopped functioning. The operator should, upon heeding this alarm, drive the automobile to a service station to have the leak in the refrigerating system of the air conditioning apparatus repaired and the system recharged. It is to be understood that discontinuance of air circulation over evaporator 17 negatives a temperature differential on opposite sides thereof and the members 52 and 53 together with the linkage therebetween then close the electric contacts of the switch portion of the sensing device to ready same for a subsequent emergency operation. It is also to be understood that while bimetal members 52 and 53 may move in unison in the same direction under varying temperature changes to which they are exposed the bimetal member 53 bows or moves toward member 52 only when air leaving evaporator 17 is warmer than air being circulated toward the evaporator whereby the sensing device and the linkage thereof is truly a temperature differential responsive switch device.

From the foregoing it should be apparent that there is provided an improved refrigerating air conditioning system for a vehicle wherein the compressor of the system, driven by the engine of the vehicle, will be properly lubricated during rather hazardous operating conditions thereof and wherein the compressor will be automatically stopped when a dangerous condition of operation of the system occurs. By these two components I prevent failure of a compressor in a refrigerating system of an automotive air conditioning apparatus and consequently the necessity of replacing the compressor. This invention utilizes by-passing of refrigerant from the compressor to the evaporator at one time in the operation of the refrigerating system for a normal purpose and also advantageously utilizes same at another time for returning oil entrapped in the evaporator to the compressor under abnormal conditions in the refrigerating system. The improvements incorporated in the refrigerating system of the air conditioning apparatus herein disclosed serve to warn the operator of the vehicle of malfunctioning of the refrigerating system whereby such malfunctioning can be promptly corrected so as not to deprive passengers of the comfort of air conditioning over a prolonged period of time and also serve to automatically stop operation of the compressor of the refrigerating system independently of the manually actuated control thereof.

While the form of embodiment of the invention as herein disclosed constitutes a preferred form, it is to be understood that other forms might be adopted, as may come within the scope of the claims which follow.

What is claimed is as follows:

1. In a vehicle, an engine for propelling said vehicle, a refrigerating system carried by said vehicle for cooling air in a compartment thereof, said system comprising a compressor, a condenser, an evaporator and refrigerant flow connections therebetween, means for operating said compressor from said engine, means in said connections controlling admission of liquid refrigerant into said evaporator, a conduit in said system adapted to by-pass refrigerant discharged from said compressor around said condenser and said admission means directly into said evaporator, blower means for circulating air from one side of said evaporator thereover to the opposite side thereof and into said compartment, means controlling said by-pass conduit for regulating the temperature within said compartment, and means rendered effective automatically in response to a predetermined temperature differential in the circulating air on said opposite sides of said evaporator for stopping operation of said compressor by said engine.

2. In a vehicle, an engine for propelling said vehicle, a refrigerating system carried by said vehicle for cooling air in a compartment thereof, said system comprising a compressor, a condenser, an evaporator and refrigerant flow connections therebetween, means for operating said compressor from said engine, means in said connections controlling admission of liquid refrigerant into said evaporator, a conduit in said system adapted to by-pass refrigerant discharged from said compressor around said condenser and said admission means directly into the lowermost portion of said evaporator, blower means for circulating air from one side of said evaporator thereover to the opposite side thereof and into said compartment, means for intermittently opening said by-pass conduit to regulate the temperature within said compartment and agitate refrigerant fluid contained in said evaporator, and means rendered effective automatically in response to a predetermined temperature differential in the circulating air on said opposite sides of said evaporator for stopping operation of said compressor by said engine, said last named means being operative only when the temperature of air leaving the evaporator exceeds the temperature of air directed over said evaporator.

3. In a vehicle, an engine for propelling said vehicle, a refrigerating system carried by said vehicle for cooling air in a compartment thereof, said system comprising a compressor, a condenser, an evaporator and refrigerant flow conduits therebetween, means for operating said compressor from said engine, blower means for circulating air from one side of said evaporator thereover to the opposite side thereof and into said compartment, and means for stopping operation of said compressor by said engine, said last named means being rendered effective automatically in response to a predetermined temperature differential in the circulating air on said opposite sides of said evaporator.

4. In a vehicle, an engine for propelling said vehicle, a refrigerating system carried by said vehicle for cooling air in a compartment thereof, said system comprising a compressor, a condenser, an evaporator and refrigerant flow conduits therebetween, means for operating said compressor from said engine, blower means for circulating air from one side of said evaporator thereover to the opposite side thereof and into said compartment, and means rendered effective automatically for stopping operation of said compressor by said engine, said last named means being operative only when the temperature of air leaving the evaporator substantially exceeds the temperature of air directed over said evaporator.

5. In a vehicle, an engine for propelling said vehicle, refrigerating apparatus for cooling air in a compartment of said vehicle, said apparatus comprising a compressor, a condenser, an evaporator and refrigerant flow conduits therebetween, means adapted to drivingly connect said compressor to said engine and to disconnect same therefrom including an electrically actuated clutch, an electric circuit for said clutch having a switch therein for energizing and deenergizing the clutch to control said driving means and thereby operation of said compressor by said engine, blower means in said electric circuit for circulating air from one side of said evaporator thereover to the opposite side thereof and into said compartment, and means in said electric circuit responsive automatically to a predetermined temperature differential in the circulating air on said opposite sides of said evaporator for deenergizing said clutch and stopping operation of said compressor by said engine independently of said switch.

6. In a vehicle, an engine for propelling said vehicle, refrigerating apparatus for cooling air in a compartment of said vehicle, said apparatus comprising a compressor, a condenser, an evaporator and refrigerant flow conduits therebetween, means adapted to drivingly connect said compressor to said engine and to disconnect same therefrom including an electrically actuated clutch, an electric circuit for said clutch having a switch therein for energizing and deenergizing the clutch to control said driving means and thereby operation of said compressor by said engine, blower means in said electric circuit for circulating air from one side of said evaporator thereover to the opposite side thereof and into said compartment, and means in said electric circuit responsive automatically to a predetermined temperature differential in the circulating air on said opposite sides of said evaporator for deenergizing said clutch and stopping operation of said compressor by said engine independently of said switch, said last named means being operative only when the temperature of air leaving the evaporator exceeds the temperature of air directed over said evaporator.

7. In a vehicle, an engine for propelling said vehicle, refrigerating apparatus for cooling air in a compartment of said vehicle, said apparatus comprising a compressor, a condenser, an evaporator and refrigerant flow conduits therebetween, means adapted to drivingly connect said compressor to said engine and to disconnect same therefrom including an electrically actuated clutch, an electric circuit for said clutch having a switch therein for energizing and deenergizing the clutch to control said driving means and thereby operation of said compressor by said engine, blower means in said electric circuit for circulating air from one side of said evaporator thereover to the opposite side thereof and into said compartment, and means in said electric circuit operating automatically in response to an increase in the temperature of air leaving said evaporator above the temperature of air directed thereover for deenergizing said blower and said clutch to stop operation of said compressor by said engine independently of said switch.

8. In a vehicle, an engine for propelling said vehicle, refrigerating apparatus for cooling air in a compartment of said vehicle, said apparatus comprising a compressor, a condenser, an evaporator and refrigerant flow conduits therebetween, means adapted to drivingly connect said compressor to said engine and to disconnect same therefrom including an electrically actuated clutch, an electric circuit for said clutch having a switch therein for energizing and deenergizing the clutch to control said driving means and thereby operation of said compressor by said engine, means controlling admission of liquid refrigerant into said evaporator, said apparatus also comprising means for by-passing refrigerant discharged from said compressor around said condenser and said admission means directly into said evaporator, means for controlling said by-pass means to regulate the temperatures in said compartment, blower means in said electric circuit for circulating air from one side of said evaporator thereover to the opposite side thereof and into said compartment, and means in said electric circuit responsive automatically to a predetermined temperature differential in the circulating air on said opposite sides of said evaporator for deenergizing said clutch and stopping operation of said compressor by said engine independently of said switch.

9. In a vehicle, an engine for propelling said vehicle, refrigerating apparatus for cooling air in a compartment of said vehicle, said apparatus comprising a compressor, a condenser, an evaporator and refrigerant flow conduits therebetween, means adapted to drivingly connect said compressor to said engine and to disconnect same therefrom including an electrically actuated clutch, an electric circuit for said clutch having a switch therein for energizing and deenergizing the clutch to control said driving means and thereby operation of said compressor by said engine, means controlling admission of liquid refrigerant into said evaporator, said apparatus also comprising means for by-passing refrigerant discharged from said compressor around said condenser and said admission means directly into said evaporator, means for controlling said by-pass means to regulate the temperatures in said compartment, blower means in said electric circuit for circulating air from one side of said evaporator thereover to the opposite side thereof and into said compartment, and means in said electric circuit responsive automatically to a predetermined temperature differential in the circulating air on said opposite sides of said evaporator for deenergizing said clutch and stopping operation of said compressor by said engine independently of said switch, said last named means being operative only when the temperature of air leaving the evaporator exceeds the temperature of air directed over said evaporator.

10. In a vehicle, an engine for propelling said vehicle, refrigerating apparatus for cooling air in a compartment of said vehicle, said apparatus comprising a compressor, a condenser, an evaporator and refrigerant flow conduits therebetween, means adapted to drivingly connect said compressor to said engine and to disconnect same therefrom including an electrically actuated clutch, an electric circuit for said clutch having a switch therein for energizing and deenergizing the clutch to control said driving means and thereby operation of said compressor by said engine, means controlling admission of liquid refrigerant into said evaporator, said apparatus also comprising means for by-passing refrigerant discharged from said compressor around said condenser and said admission means directly into said evaporator, means for controlling said by-pass means to regulate the temperatures in said compartment, blower means in said electric circuit for circulating air from one side of said evaporator thereover to the opposite side thereof and into said compartment, and means in said electric circuit operating automatically in response to an increase in the temperature of air leaving said evaporator above the temperature of air directed thereover for deenergizing said blower and said clutch to stop operation of said compressor by said engine independently of said switch.

11. In a vehicle, an engine for propelling said vehicle, a refrigerating system carried by said vehicle and adapted to contain refrigerant and oil miscible therewith for cooling a compartment in the vehicle, said system comprising a compressor, a condenser, an evaporator and fluid flow connections therebetween, means for operating said compressor from said engine, means controlling admission of a mixture of liquid refrigerant and oil into the lower portion of said evaporator, some of the oil of said mixture admitted to said evaporator being entrapped therein by evaporation of refrigerant therefrom, blower means for circulating air from one side of said evaporator thereover to the opposite side thereof and into said compartment, a valve interposed in said fluid flow connections between said compressor and said condenser and having a conduit connection with said evaporator intermediate same and said admission means, means for periodically opening said valve during operation of said refrigerating system when the charge of refrigerant therein has been diminished below normal to by-pass hot refrigerant discharged from said compressor around said condenser and said admission means, said by-passed refrigerant being directed into the bottom of said evaporator for agitating oil entrapped therein and forcing the entrapped oil therefrom back to said compressor, and means effective only after the charge of refrigerant in said system has been substantially exhausted therefrom for stopping operation of the compressor thereof by said engine, said last named means being responsive automatically to a predetermined differential in the temperature of the circulating air on said opposite sides of said evaporator.

12. In a vehicle, an engine for propelling said vehicle, a refrigerating system carried by said vehicle and adapted to contain refrigerant and oil miscible therewith for cooling a compartment in the vehicle, said system comprising a compressor, a condenser, an evaporator and fluid flow connections therebetween, means for operating said compressor from said engine, means controlling admission of a mixture of liquid refrigerant and oil into the lower portion of said evaporator, some of the oil of said mixture admitted to said evaporator becoming entrapped therein by evaporation of refrigerant therefrom, a combined manually and automatically actuated valve interposed in said fluid flow connections between said compressor and said condenser, a conduit extending from said valve and connected with said evaporator intermediate same and said admission means, said valve being provided with an adjustable means movable from within said compartment of the vehicle by the operator thereof to regulate the temperature in the compartment, and said valve being openable independently of its manual adjustment solely in response to a differential in pressure of refrigerant within said condenser and that contained in said conduit to nonrestrictively bypass refrigerant discharged from said compressor around the condenser and said admission means directly into the bottom of said evaporator for agitating oil entrapped therein and forcing the entrapped oil therefrom back to said compressor.

13. A refrigerating system for cooling air in a compartment, said system comprising an evaporator, a condenser, a compressor, refrigerant flow connections therebetween and means for operating said compressor, means in said connections controlling admission of liquid refrigerant from said condenser into said evaporator, a conduit in said system adapted to by-pass refrigerant discharged from said compressor around said condenser and said admission means directly into said evaporator, blower means for circulating air from one side of said evaporator thereover to the opposite side thereof and into said compartment, means controlling said by-pass conduit for normally regulating the temperature within said compartment, and means rendered effective automatically in response to a predetermined temperature differential in the circulating air on said opposite sides of said evaporator for disconnecting said compressor from its said operating means.

References Cited in the file of this patent
UNITED STATES PATENTS

| | | |
|---|---|---|
| 2,178,445 | Warneke | Oct. 31, 1939 |
| 2,281,626 | Smith | May 5, 1942 |